US011295912B2

(12) United States Patent
Ängquist et al.

(10) Patent No.: US 11,295,912 B2
(45) Date of Patent: Apr. 5, 2022

(54) ARRANGEMENT, SYSTEM, AND METHOD OF INTERRUPTING CURRENT

(71) Applicant: SCiBreak AB, Enköping (SE)

(72) Inventors: Lennart Ängquist, Enköping (SE); Staffan Norrga, Stockholm (SE)

(73) Assignee: SCIBREAK AB, Enköping (SE)

( * ) Notice: Subject to any disclaimer, the term of this patent is extended or adjusted under 35 U.S.C. 154(b) by 0 days.

(21) Appl. No.: 15/394,858

(22) Filed: Dec. 30, 2016

(65) Prior Publication Data
US 2017/0178844 A1 Jun. 22, 2017

Related U.S. Application Data

(63) Continuation of application No. PCT/SE2015/050756, filed on Jun. 29, 2015.
(Continued)

(51) Int. Cl.
*H02H 3/08* (2006.01)
*H02H 9/02* (2006.01)
(Continued)

(52) U.S. Cl.
CPC ........ *H01H 33/596* (2013.01); *H01H 33/006* (2013.01); *H02H 3/08* (2013.01); *H01H 33/593* (2013.01)

(58) Field of Classification Search
CPC ....... H01H 33/006; H01H 33/596; H02H 3/08
(Continued)

(56) References Cited

U.S. PATENT DOCUMENTS 5,452,170 A * 9/1995 Ohde ................... H01H 33/596
174/DIG. 17
5,465,030 A * 11/1995 Smith ....................... H01T 2/02
313/231.41
(Continued)

FOREIGN PATENT DOCUMENTS

CH  2 178 200    * 4/2010
EP  0 758137 A1   2/1997
(Continued)

OTHER PUBLICATIONS

Pieter Schavemaker & Lou Van Der Sluis, Electrical Power System Essentials, 2009, p. 160, John Wiley & Sons Ltd, The Atrium, Southern Gate, Chichester, West Sussex PO 19 8SQ, England.
(Continued)

*Primary Examiner* — Jared Fureman
*Assistant Examiner* — Lucy M Thomas
(74) *Attorney, Agent, or Firm* — Gabriela B. Tomescu, Esq.; Bergenstråhle & Partners AB

(57) ABSTRACT

An arrangement for interrupting current comprises a first and a second terminal. First, second, and third parallel circuit branches are arranged between the terminals to electrically connect two power networks. The first parallel circuit branch comprises a mechanical main circuit breaker, the second parallel circuit branch comprises an energy absorbing device, and the third parallel circuit branch comprises a resonant circuit and a voltage control means arranged in series. The voltage control means is controllable to inject energy into the resonant circuit to force a rapid increase of alternating current, wherein the alternating current flows in a loop containing the first and the third parallel circuit branches as the mechanical main circuit breaker is controlled to open to interrupt main current. Zero cross-over of the current through the mechanical main circuit breaker is
(Continued)

thereby realized as the alternating current amplitude exceeds the main current amplitude.

21 Claims, 17 Drawing Sheets

Related U.S. Application Data

(60) Provisional application No. 62/018,707, filed on Jun. 30, 2014.

(51) Int. Cl.
*H01H 33/59* (2006.01)
*H01H 33/00* (2006.01)

(58) Field of Classification Search
USPC ........................................................ 361/93.1
See application file for complete search history.

(56) References Cited

U.S. PATENT DOCUMENTS

| | | | |
|---|---|---|---|
| 2013/0020881 A1* | 1/2013 | Panousis | H01H 33/596 307/113 |
| 2013/0021708 A1 | 1/2013 | Demetriades et al. | |
| 2015/0002977 A1* | 1/2015 | Dupraz | H01H 9/542 361/115 |
| 2016/0006236 A1* | 1/2016 | Tang | H01H 33/596 361/91.5 |

FOREIGN PATENT DOCUMENTS

| | | |
|---|---|---|
| EP | 2 550 713 A1 | 1/2013 |
| JP | H04 259719 A | 9/1992 |
| JP | 2005 044591 A | 2/2005 |
| JP | 2013 041674 A | 2/2013 |

OTHER PUBLICATIONS

W. Mc Murray, "Power electronic Circuit Topology", Proc IEEE, Apr. 1988, pp. 428-437, vol. 76, No. 4.

* cited by examiner

*FIG. 15* A
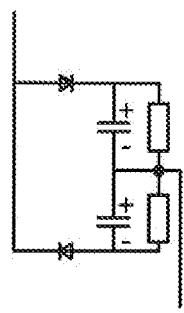
*FIG. 15* B
*FIG. 15* C
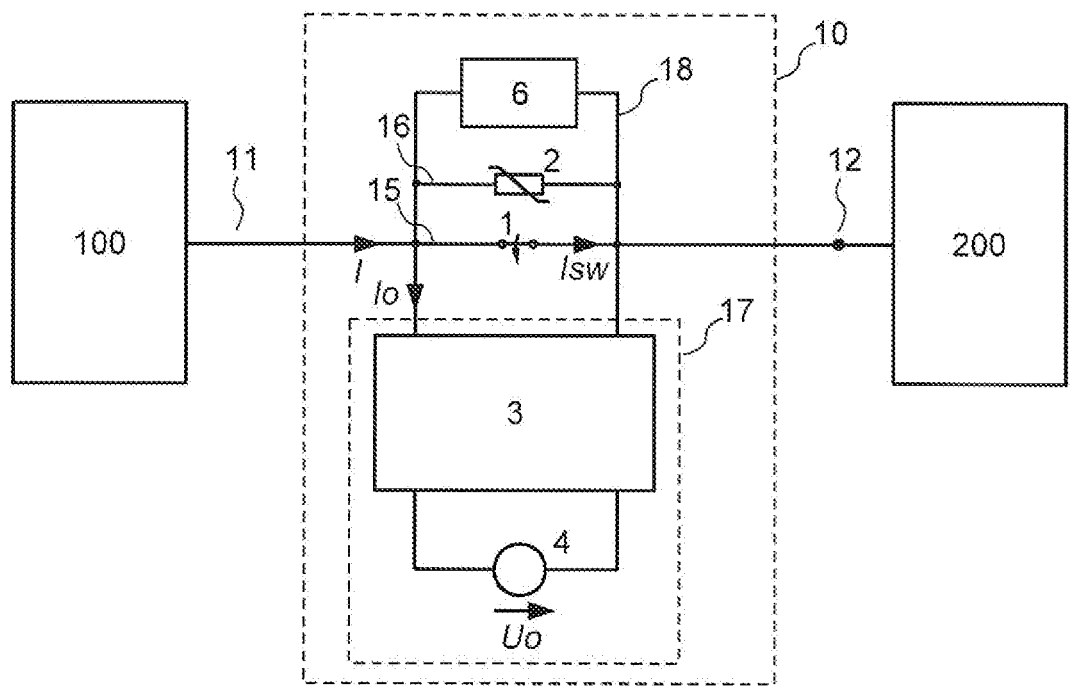
*FIG. 16* A
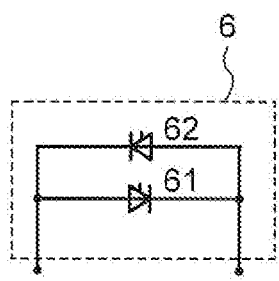
*FIG. 16* B

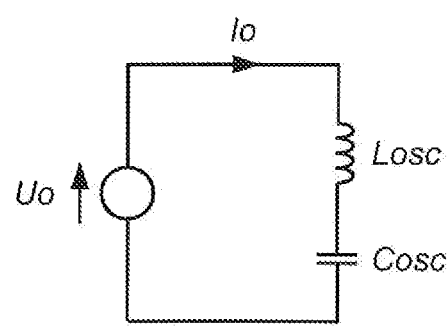 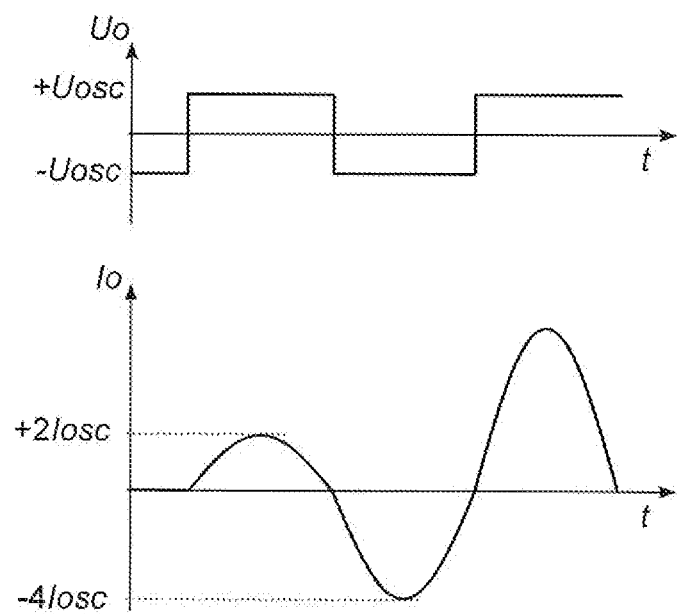
FIG. 20 A    FIG. 20 B

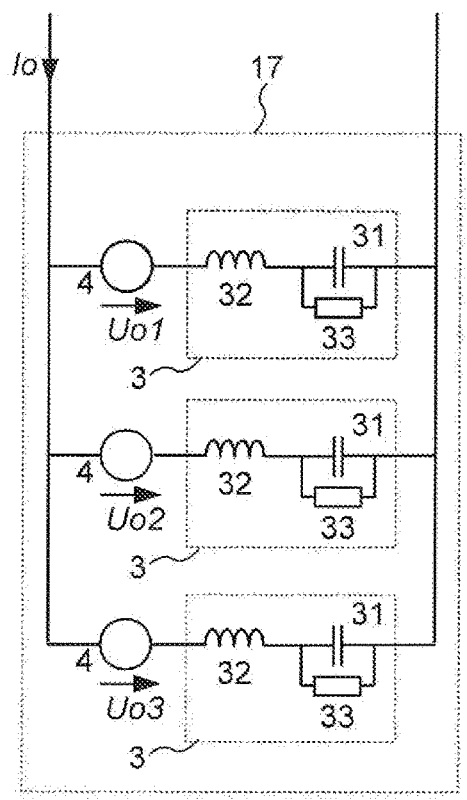
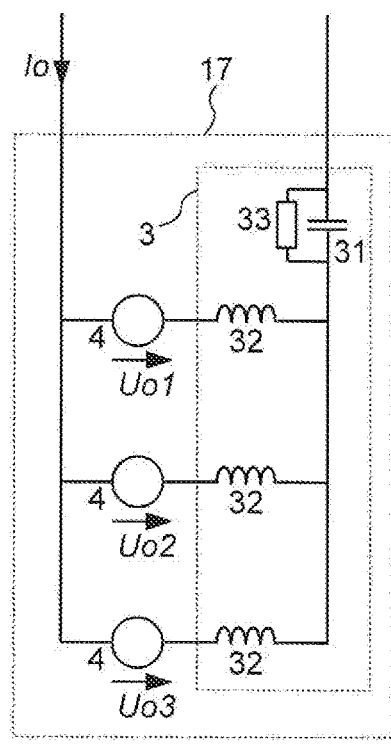
FIG. 27 A
FIG. 27 B

ARRANGEMENT, SYSTEM, AND METHOD OF INTERRUPTING CURRENT

This application is a continuation of International Application No. PCT/SE2015/050756, filed 29 Jun. 2015, which claims benefit of U.S. Provisional Application No. 62/018,707, filed 30 Jun. 2014, the entire contents of which are hereby incorporated by reference.

TECHNICAL FIELD

The present invention relates generally to interrupting current in power systems, and particularly relates to circuit breakers employing an added auxiliary oscillating current to interrupt the main current. The present invention also relates to a system and a method of interrupting current.

BACKGROUND ART

The use of circuit breakers or other current interruption means are well established in electrical systems in general, such as in electrical power distribution or transmission systems, especially as a means to protect, isolate and/or control the operation of different components in the power system particularly under fault conditions e.g. short circuit faults, or over-current conditions etc. Circuit breakers are also used to isolate parts of the power system during repairs and/or maintenance on specific components or sections of the power system. Furthermore, circuit breakers are frequently used to connect various loads, like motors or other industrial loads, to the network.

Different types of circuit breakers have been used as current interrupters depending on the current or voltage levels of the power system. Most commonly mechanical circuit breakers are used whereby the actuators, used to separate the contacts, may use motors, springs, pneumatic arrangements or some other means. Alternative current interrupters may use semiconductor devices.

Most applications require, not least for safety reasons, that the current interrupter realizes physical separation between the two sides of the circuit breaker and consequently there is a need for a mechanical switch even if a solid state current interrupter is used. Mechanical switches can also be used in parallel with solid state current interrupters in order to eliminate the losses in the semiconductor devices, which may be significant when used in high voltage applications requiring series connection of many devices in order to achieve the necessary voltage withstand capability.

When interrupting a current flowing in an electrical circuit by contact separation, an arc is in general generated between the contacts. At high voltage it is necessary that the current flowing in the arc is forced to make a zero cross-over, naturally or by artificial means, in order to extinguish. In ac power systems, current zero is naturally occurring once every half cycle of the frequency of the system, and therefore the realization of simple arrangements for ac circuit breakers is quite common and well established. It is however desired in some applications to interrupt the current in an ac system at a much faster pace than the pace offered by the naturally occurring zero cross-over of the current in order to prevent the fault current from reaching high levels or to protect sensitive equipment.

Dc systems on the other hand, lack this natural zero crossover of the current and consequently there has been many attempts to realize a fast dc breaker for interrupting fault current in dc power systems. This problem has been solved in the prior art by introducing a resonance circuit that superimposes an ac current onto the current to be interrupted to cause zero cross-over. In a PCT publication WO 2014/166528 A1, a dc circuit breaking arrangement is disclosed using a mechanical current interrupter in parallel with a resonance circuit that includes at least one capacitor, at least one inductor and at least one switch element. The resonance circuit is made to generate a resonance current superposing current of any arc generated in the current interrupter, by closing the switch element. This arrangement has the drawback that the oscillation current is basically excited by the arc voltage. To overcome this drawback, the disclosed arrangement is further provided with an auxiliary power supply unit that can if needed convey power to charge the capacitor. This arrangement requires an elaborate charging process and needs to be specifically adapted for each application.

U.S. Pat. No. 4,805,062 discloses a solution to the problem by using a charged capacitor to force a current zero. To do this it discloses a dc circuit breaker comprising a commutation capacitor with one end connected to the positive bus of a dc line and the other end to a negative bus of the dc line through a charging resistor, and a series circuit, including a magnetic repulsive coil and a second switch, connected in parallel to the commutation capacitor, in which the commutation capacitor is charged directly from the positive dc line. When the breaker unit starts to open, the second switch is turned on in order to reverse the polarity of the charged commutation capacitor so that it causes a reverse discharge current through the breaker unit simultaneously as the breaker unit opens. This invention has the drawback of very limited controllability and therefore it is difficult to achieve optimal switching behavior. Furthermore, the solution is less appropriate in high voltage applications, which present constraints on the proposed charging mechanism.

A circuit breaking arrangement adapted for direct current transmission line is disclosed in WO2014/154260 A1. The circuit breaker arrangement comprises a mechanical current interrupter unit adapted to, when actuated, interrupt current in the transmission line and two resonance circuits wherein each of the resonance circuit is adapted to, upon actuation of the current interrupter unit, to generate a resonance current superposing current of any arc generated in the current interrupter unit, and where the resonance current that has been generated by the first resonance circuit flows into the current interrupter unit from a different direction than the resonance current generated by the second resonance circuit. This proposed solution suffers the disadvantage of having two resonant circuits with added complexity of the control for the two switches that connects the resonant circuits.

Examples of prior art arrangements for interrupting current are shown in FIGS. 1-3.

SUMMARY OF INVENTION

An object of the present invention is to overcome the problems and drawbacks of the prior art and disclose a superior current interrupting capability regardless of the type of current to be interrupted.

According to a first aspect of the invention, this object is realized by an arrangement for interrupting current comprising a first and a second terminal, at least a first, a second, and a third parallel circuit branch arranged between the first and second terminals, the arrangement being adapted to electrically connect two sections of a power system, the first parallel circuit branch comprising a mechanical main circuit breaker, the second parallel circuit branch comprising an energy absorbing device, and the third parallel circuit branch comprising a resonant circuit and a voltage control means arranged in series with the resonant circuit, the arrangement being characterized in that the voltage control means being controllable in use to inject energy into the resonant circuit to force a rapid increase of an alternating current, wherein the alternating current being flowing in a loop containing the first and the third parallel circuit branch as the mechanical main circuit breaker is being controlled to open to interrupt a main current, and whereby zero cross-over of the current through the mechanical main circuit breaker is realized as the alternating current amplitude exceeds the main current amplitude.

In a preferred embodiment, the arrangement comprises at least one disconnecting switch arranged in series connection with at least one of the first and second terminals, and being controllable in use to provide a physical separation of the two said power networks.

In a preferred embodiment, the voltage control means is a static voltage source converter.

In a preferred embodiment, the resonant circuit comprises at least one capacitor and at least one reactor arranged in series.

In a preferred embodiment, the at least one capacitor of the resonant circuit is provided with a discharging means.

In a preferred embodiment, the resonant circuit comprises distributed series inductance and distributed shunt capacitance, preferably a cable arrangement.

In a preferred embodiment, the mechanical circuit breaker comprises a vacuum switch.

In a preferred embodiment, the mechanical breaker comprises a contact adapted to move during the opening process of the mechanical breaker, and wherein the mechanical breaker comprises at least one sensor. In one embodiment, the sensor is adapted in use to determine at least one of the position and the velocity of the contact during the opening process of the mechanical breaker. The sensor may additionally or alternatively be adapted to detect a physical quantity, preferably at least one of appearance of arcing voltage drop, acoustical phenomena and electromagnetic radiation or noise, such as optical, thermal, or X-ray radiation.

In a preferred embodiment, the energy absorbing device is a voltage limiting, energy absorbing device, such as a non-linear voltage dependent resistance, preferably a Metal Oxide Varistor (MOV).

In a preferred embodiment, the first parallel circuit branch further comprises a saturable reactor arranged in series with the mechanical breaker to help reduce the rate of change of current in the proximity of the zero cross-over of the current through the mechanical breaker.

In a preferred embodiment, the arrangement further comprises a fourth parallel circuit branch arranged in parallel with said first, second, and third parallel circuit branches, said fourth parallel circuit branch being provided with control means to, during a current interruption, provide an alternative path for the reverse current away from the mechanical breaker. The control means preferably comprises two thyristors arranged in anti-parallel to control current flow through said two thyristors in opposite directions.

In a preferred embodiment, the first parallel circuit branch further comprises a low-voltage semiconductor switch arranged in series with the mechanical breaker, the low-voltage semiconductor being controllable in use to help divert the current from the main mechanical breaker to the fourth parallel circuit branch.

In a preferred embodiment, the arrangement for interrupting current is a dc breaker.

In a preferred embodiment, the resonant circuit is a passive resonant circuit.

According to a second aspect of the invention, a system for interrupting current is provided comprising at least two arrangements for interrupting current according to the invention, wherein said at least two arrangements for interrupting current are connected in series.

According to a third aspect of the invention, a method of interrupting current in a power system is provided using an arrangement for interrupting current according to the invention, the method comprising the steps of; opening the mechanical circuit breaker to facilitate the separation of the contacts of the mechanical breaker and to interrupt a main current having an amplitude, and controlling the voltage control means to excite an oscillating current having a maximum amplitude higher than the amplitude of the interrupted main current, to cause current zero-crossing.

In a preferred embodiment, the steps of opening the mechanical circuit breaker and controlling the voltage control means are performed concurrently and in coordination.

In a preferred embodiment, the method of interrupting current further comprises one or more of the steps of opening the disconnecting switch, operating the control means to allow conduction in the reverse direction relative the main current through the mechanical breaker, and controlling the semiconductor switch to open when the total current through the mechanical breaker goes through a zero-crossover.

In a preferred embodiment, the sequence of the execution of the steps are predefined such that the zero-crossings in the current passing through the mechanical breaker occur at optimal time instants with respect to the dielectric isolation strength that is built up in the breaker, when the contacts separate from each other.

In a preferred embodiment, the sequence of steps is executed with predefined time delays between the consecutive steps, and wherein the time delays are constants or varied dependent on the amplitude of the main current to be interrupted.

In a preferred embodiment, the predefined time delays between consecutive steps are optimized so that the contact separation distance of the mechanical breaker is sufficient to withstand the voltage limit of the energy absorbing device of the second parallel branch in a minimum total time.

In a preferred embodiment, a sensor is used to determine the time delays between the steps.

In a preferred embodiment, the execution of one or several of the steps is conditional, so that an oscillating current, which has such amplitude that zero-crossings occur in the current flowing through the mechanical interrupter, is excited and maintained, until a decision is taken, either to execute the complete sequence of steps to interrupt the main current, or not to complete the interruption, in which case the oscillating current will be suppressed.

BRIEF DESCRIPTION OF DRAWINGS

The invention is now described, by way of example, with reference to the accompanying drawings, in which:

FIGS. 15A-C show implementations of a voltage limiting, energy absorbing device;

FIGS. 16A-B show an alternative embodiment of an arrangement for interrupting current having a branch for reverse current;

FIGS. 20A-B show the principle of buildup of oscillating current amplitude in a resonant circuit;

FIGS. 27A-B show alternative configurations of a branch of an arrangement for interrupting current according to the invention.

DESCRIPTION OF EMBODIMENTS

In the following, a detailed description of an arrangement, a system, and a method for interrupting current according to the invention will be given.

Figure 1:
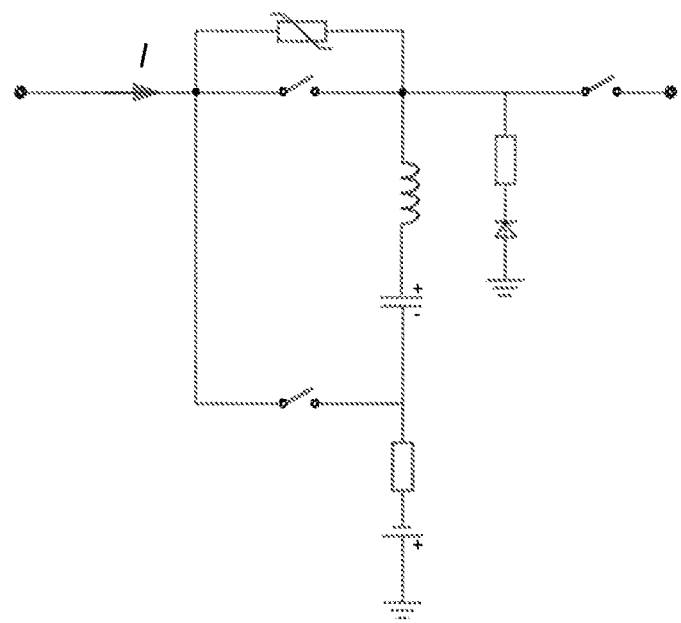
FIGS. 1-3 show prior art arrangements for interrupting current.
Figure 2:
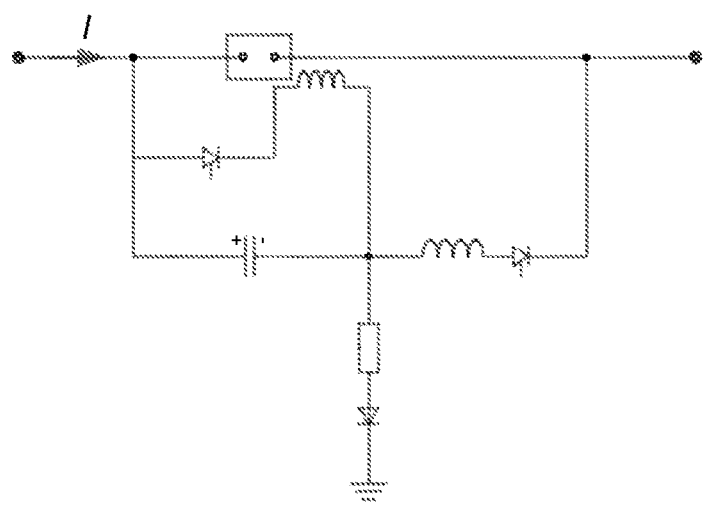
Figure 3:
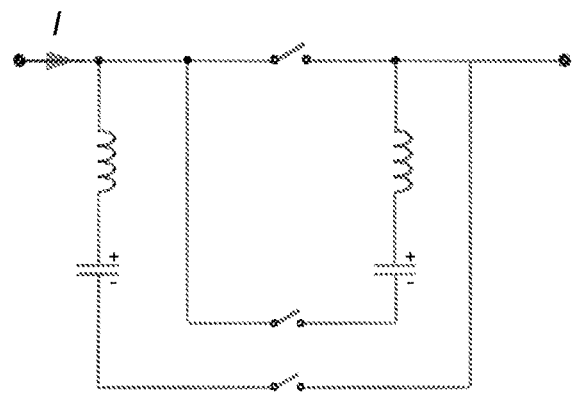
Figure 4:
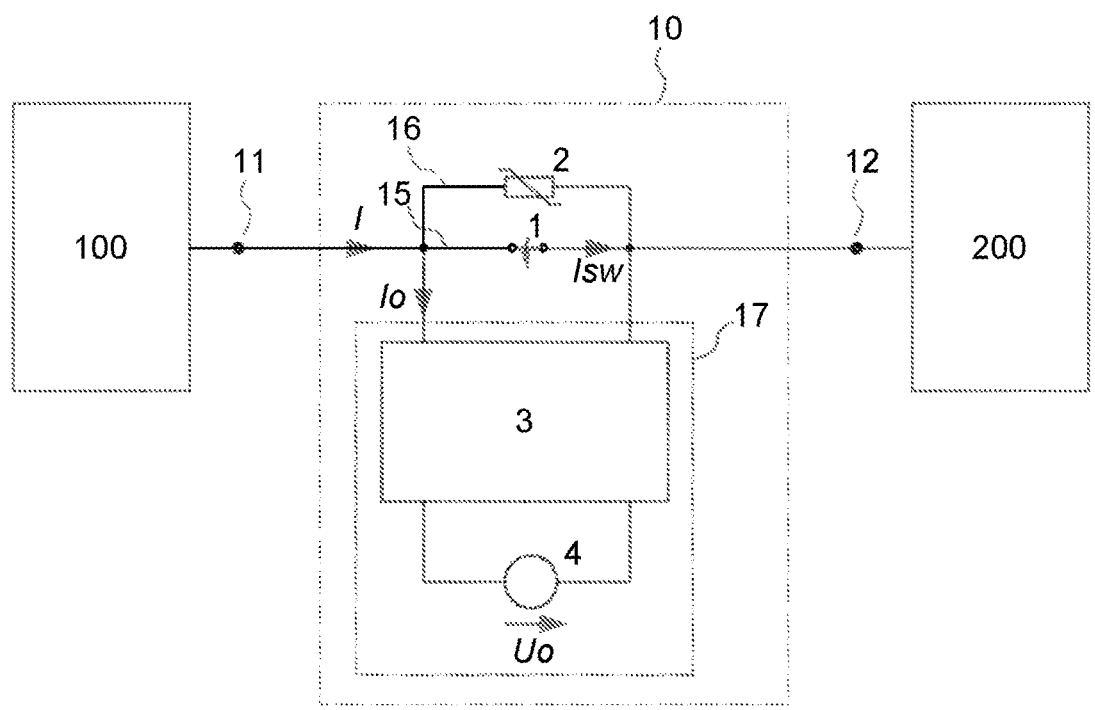
FIG. 4 shows a diagram of a general embodiment of an arrangement for interrupting current according to the invention.

The general form of the invention in claim 1 is outlined in FIG. 4, where two electrical nodes 11, 12 in a power system are electrically connected through an arrangement containing three parallel branches, the first 15 comprising a mechanical breaker 1, the second 16 comprising a voltage limiting, energy absorbing device 2 and the third comprising a controllable voltage source 4 connected in series with a passive resonant circuit 3, together designated 17. The electrical connection between sections 100 and 200 in the power system serves the purpose of transferring electrical power between said sections, in which case a main current I flows through the mechanical breaker 1. The sections 100 and 200 may be subsystems of a common power system or separate electrical power transmission systems using dc or ac. Alternatively, the sections may represent an electrical power system feeding a load, e.g. a motor 200 connected to a power source 100.

At contact separation in the mechanical breaker an internal arc will be established between the contacts and the main current I will continue to flow through the arc. If the mechanical switch operates at high voltage, the arc will only extinguish if a current zero cross-over, natural or forced by artificial means, occurs.

Figure 5:
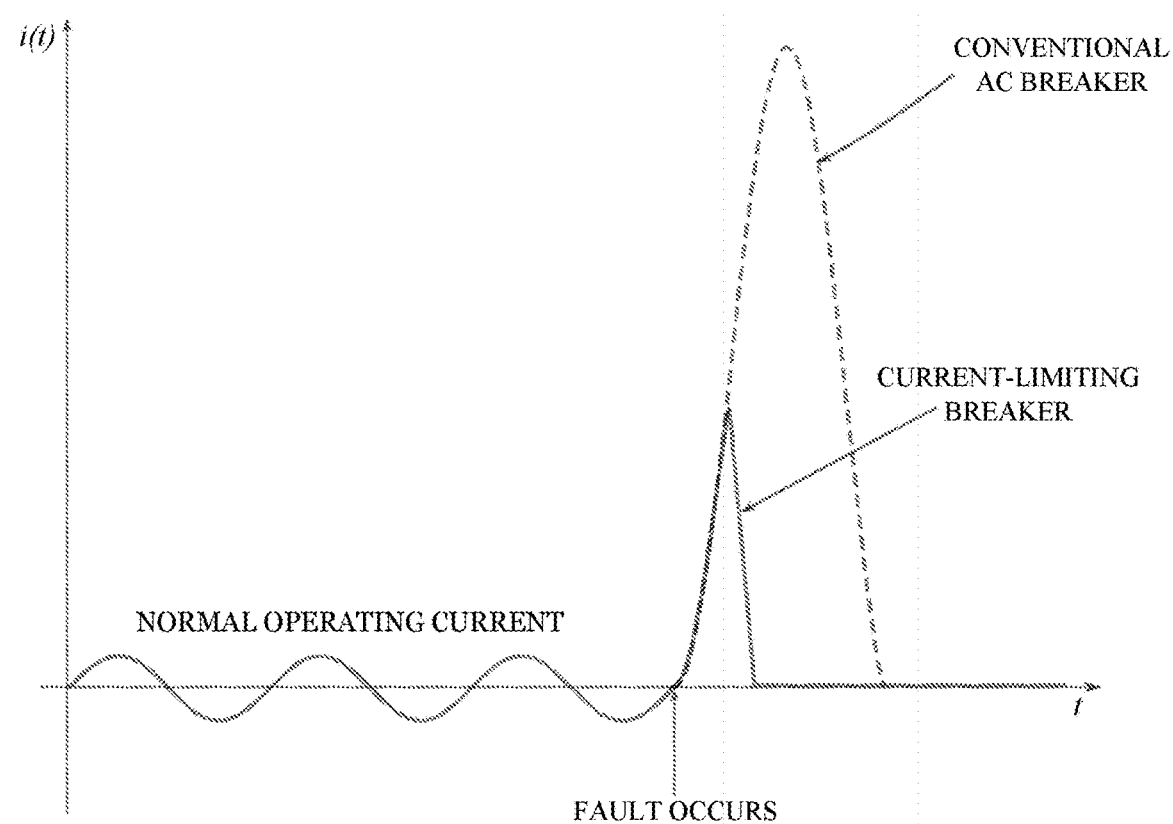
FIG. 5 shows a time diagram of current-limiting breaking.

In ac systems the main current I has natural zero-crossings and the arc will be extinguished at such a zero-crossing, as soon as the contact separation is sufficient to present a voltage withstand capability that exceeds the voltage appearing after current extinction. At short-circuits the current typically first increases towards a very high peak value before it approaches any zero cross-over. It may then be desired to perform an instantaneous interruption before the current has reached its peak value without awaiting the zero-crossing. This approach, known as current-limiting breaking of the main current, is elucidated in FIG. 5.

When the power transmission system utilizes direct voltage, like hvdc systems, the current does not exhibit any natural zero-crossings. The current rather rises towards a very high value at faults in any or both of the interconnected systems 100, 200. Fast intervention of a current interrupting system then is required in order to prevent a total collapse of the interconnected power system.

From a breaker perspective the instantaneous, current-limiting breaking in an ac system is equivalent to interrupting direct current in a dc system because in both cases it is desired to interrupt the current through the mechanical switch 1 in absence of any natural zero-crossing.

The invention presents an apparatus and a method to perform fast interruption of the main current I through the mechanical breaker 1. When the latter is being controlled to operate in order to interrupt a main current I, the controllable voltage source 4 is used to inject energy into the resonant circuit 3, thereby forcing a rapid increase of the amplitude AIo of an alternating current Io that flows in a loop containing the first 15 and the third 17 parallel circuit branches, whereby zero cross-over of the current Isw through the mechanical main breaker 1 is developed, when the alternating current amplitude AIo exceeds the main current amplitude AI.

The main current I will temporarily be transferred into branch 17, once the current Isw through the mechanical switch 1 has been extinguished at its zero cross-over, and finally it will commutate into the branch 16, comprising the voltage limiting, energy absorbing device 2. The protective voltage of device 2 must exceed the highest driving voltage in the inter-connected sections 100, 200, in order to eliminate the main current I. The branch 17, connected in parallel with device 2, must withstand the full protective voltage of the latter device. As the voltage source 4 only provides a low output voltage, the passive resonant circuit 3 preferably includes a series capacitor having the required high voltage withstand capability.

The voltage source 4 is controlled to inject energy into the resonant circuit 3 in order to force a rapid increase of an alternating current Io as long as current flows through main switch 1. In a first control approach for the voltage source 4 positive feedback of the measured current direction through the resonant link 3 is exploited. The voltage source 4 then appears like an artificial negative resistance inserted in the circuit. The value of the negative resistance can be deliberately selected by design. In a second control approach to excite the resonant circuit 3 by injecting energy, the voltage source 4 is controlled to produce an output voltage with a frequency close to the resonance frequency. The frequency may be varied in order to control the rate of rise of the amplitude AIo of the oscillating current Io. Other control methods for the oscillating current Io may be used. Moreover, due to the use of a controllable voltage source 4, the energy injection in the resonant circuit 3 can be initiated before contact separation in the main breaker 1 has occurred.

Figure 6:
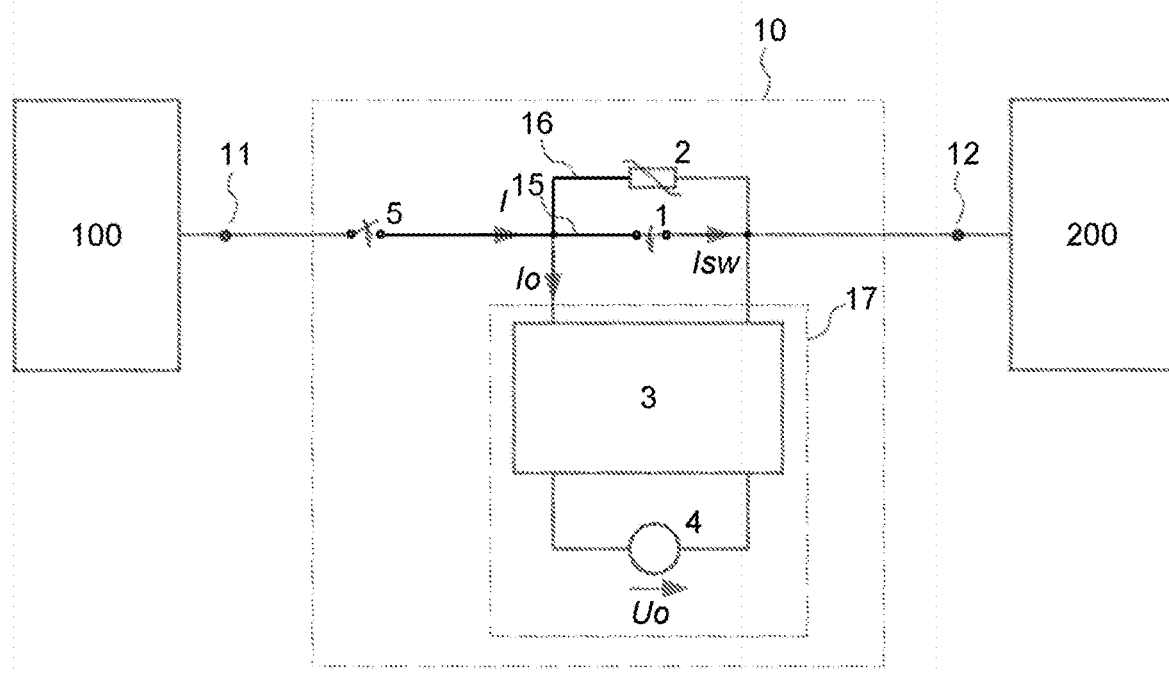
FIG. 6 shows an arrangement similar to the one of FIG. 4 but with a disconnector.

In an alternative embodiment of an arrangement for interrupting current, a disconnecting switch 5 is connected in series with the interrupting arrangement 10 described with reference to FIG. 4. This arrangement is shown in FIG. 6. When the main current I has been interrupted by the arrangement 10 the voltage limiting, energy absorbing device 2 does not conduct any current as the voltage between the terminals 11, 12 is lower than its protective voltage. Consequently the sections 100, 200 remain connected only through the branch consisting of the resonant circuit 3 in series with the voltage source 4. This branch contains a small series capacitor and therefore the disconnecting switch 5 can be opened without any sustained arcing. When open, the disconnecting switch 5 provides a physical separation in the electrical connection between the sections 100,200 of the power system.

In one scheme for operating the connection between the sections 100, 200 of the power system, the disconnector 5 is used to close the connection. In this case the resonant circuit 3 can be discharged once the disconnector 5 has been opened, and the main switch 1 can then be closed without any discharge pulse. The arrangement 10 thereby becomes ready to perform current interruption immediately at reclosing of the disconnector 5.

In another scheme for operating the connection between the sections 100, 200 of the power system the disconnecting switch 5 is closed before the mechanical main switch 1. The former then must be designed to allow the current pulse that charges the resonant circuit capacitor that occurs, when it closes. Moreover, in this case the main switch 1 must withstand the discharge pulse that appears when it closes.

The controllable voltage source 4 is preferably a static voltage source converter. It may be implemented in many ways using different types of semiconductors. FIGS. 7a-e depict a number of possible converter designs as examples of useful circuit topologies. Typically such a converter utilizes at least one dc link 41 (or 41a, 41b), which typically consists of a dc capacitor bank. The latter may be supplemented by batteries or any other dc voltage source. The dc link may be powered by any isolated auxiliary power supply, local dc generating device like e.g. fuel cells, photovoltaic cells or energy storage of any kind. The frequency of the output voltage of the converter preferably appears in the 5-25 kHz range. The dc link voltage, which determines the voltage rating of the semiconductors in the converter, is only a fraction of the protective voltage of the energy absorbing device 2. Note that series connection of several bridges with separate dc links can be utilized in order to achieve high output voltage without the need to use strings with direct series connection of semiconductor devices. The semiconductors and the dc link must be designed to withstand high discharge currents or over-voltages or be equipped with adequate protective means.

Figure 7A:
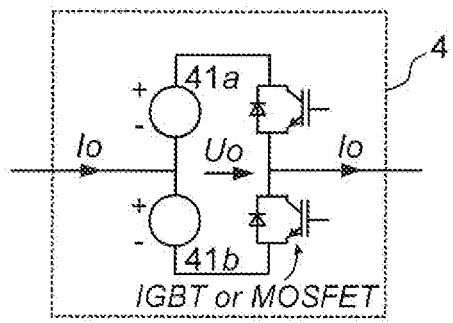
FIGS. 7A-E show different implementations of a power electronic converter.
Figure 7B:
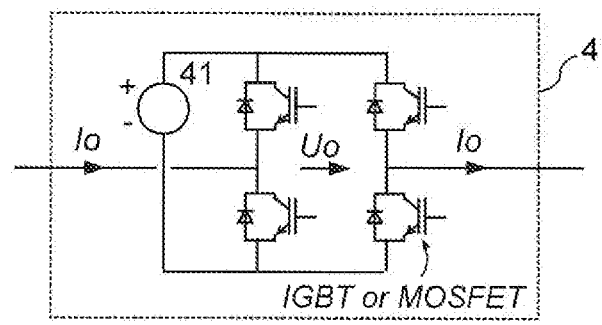
Figure 7C:
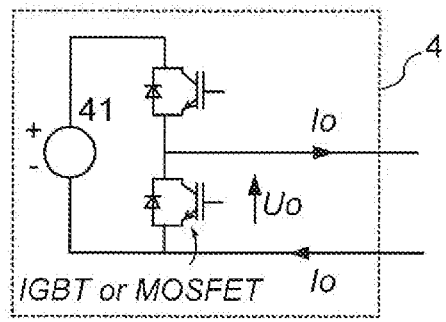
Figure 7D:
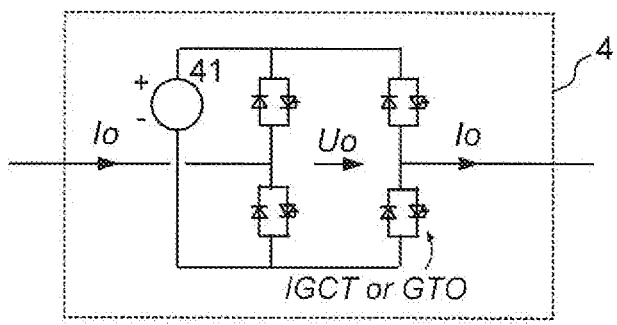
Figure 7E:
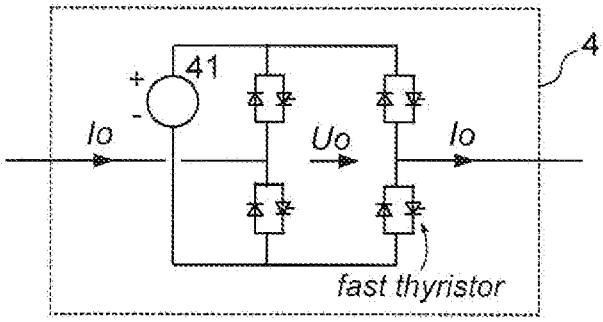

The circuits in FIGS. 7a-f use one or two half-bridge phase-legs. In FIGS. 7a and 7c only one half-bridge is used. Symmetrical output voltage (with both polarities) can be obtained, if the midpoints of the phase-leg and dc-link respectively are used as output terminals as shown in FIG. 7a, while unipolar voltage and zero voltage will be available when the midpoint of the phase leg and one of the dc link rails serve as output terminals as in FIG. 7c. If the converter is configured as an H-bridge using two phase-legs as in FIGS. 7b, 7d and 7e, it can produce output voltages with either polarity as well as zero voltage. In the topologies shown in FIGS. 7b-e, the oscillating current Io totally bypasses the dc link when the output voltage is zero.

If the semiconductor bridges are blocked, i.e. no active semiconductor devices are turned on, the oscillating current Io will pass through the diodes in the converter arms, charging the dc link. As a result the oscillating current will be suppressed by the opposing voltage, whose amplitude is determined by the voltage in the dc link 41 (or 41a,41b).

Figure 8A:
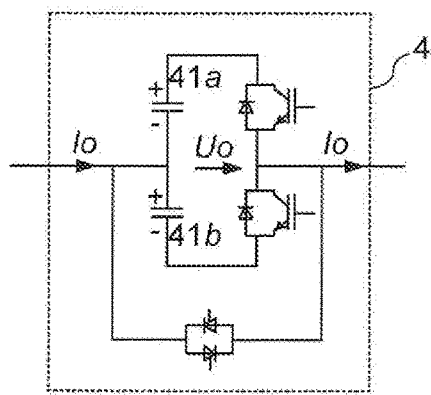
FIGS. 8A-B show examples of protective arrangements for a power electronic converter.
Figure 8B:
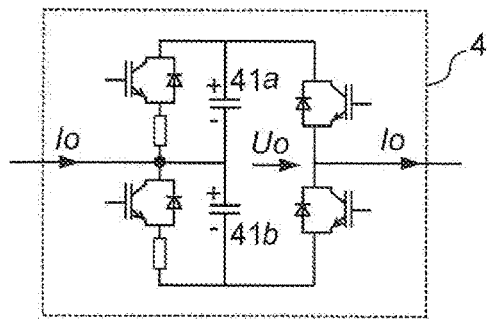

Examples of protective arrangements intended to protect the power electronic converter (semiconductor and dc-link) against surge current and over-voltage are shown in FIG. 8a and FIG. 8b respectively.

In FIGS. 7a-e, semiconductors of type MOSFET, IGBT, IGCT/GTO and thyristors have been indicated. The first three semiconductor families hold inherent current extinguishing capability and they can be switched close to the zero-crossing of the oscillating current Io. The turn-on of the thyristor, on the other hand, must be delayed after the zero-crossing of the oscillating current Io in order to let its phase-leg companion thyristor recover after conducting.

Preferably, the resonant circuit 3 comprises only passive elements. Mainly the components are linear, however sometimes non-linear devices also may be included, e.g. varistors limiting the voltage stress on components like capacitors or reactors.

Figure 9:
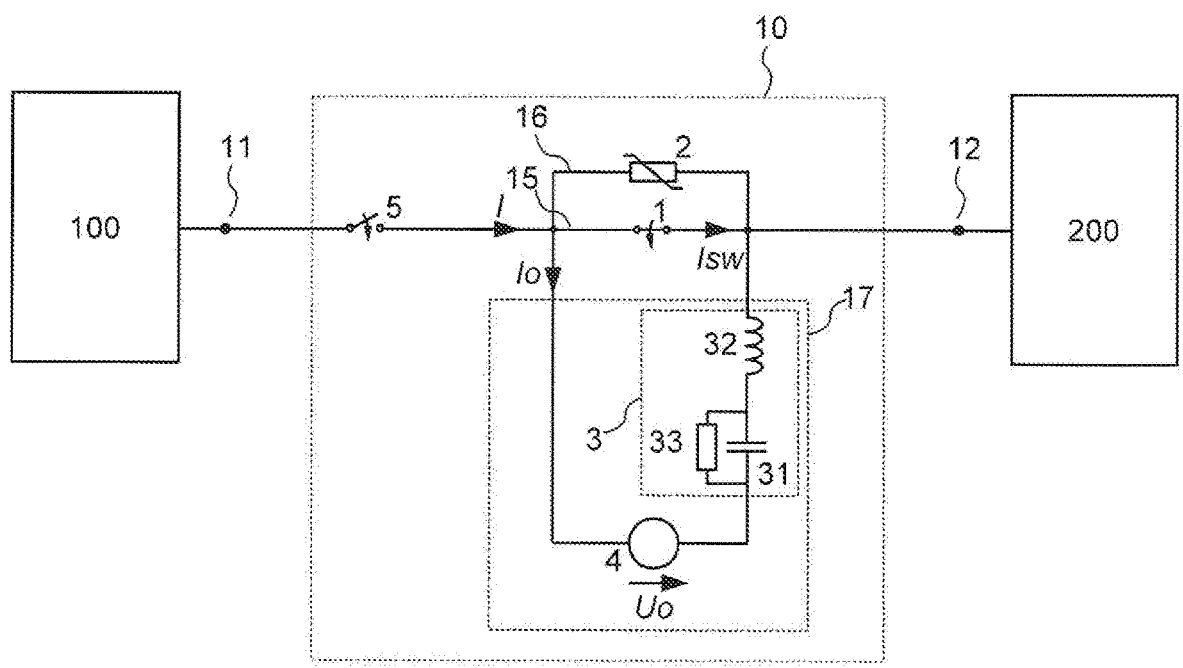
FIG. 9 shows an alternative embodiment of an arrangement for interrupting current comprising a resonance circuit containing capacitor and inductor.

The controllable voltage source 4 has very limited voltage handling capability, far below the protective voltage in the energy-absorbing device 2. Therefore, it is necessary that the series-connected resonant circuit 3 withstands a high voltage at zero current. This requirement is fulfilled, if the resonant circuit 3 comprises at least one series-connected capacitor 31, as shown in the embodiment of FIG. 9. The capacitor must be rated to withstand the protective voltage that occurs across the voltage-limiting energy-absorbing device 2. Moreover, the circuit comes out resonant, if at least one inductor 32 is connected in series with the capacitor.

Figure 10A:
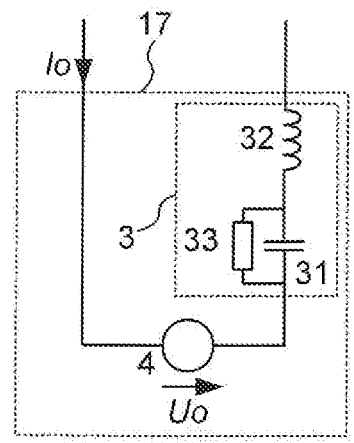
FIGS. 10A-C show different configurations of a resonant circuit.
Figure 10B:
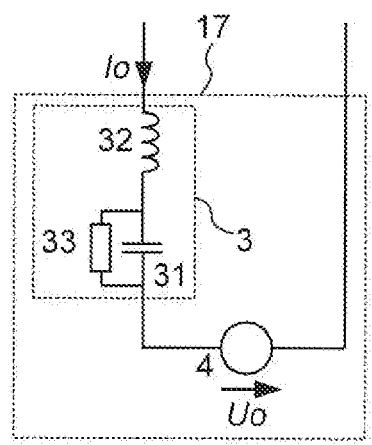
Figure 10C:
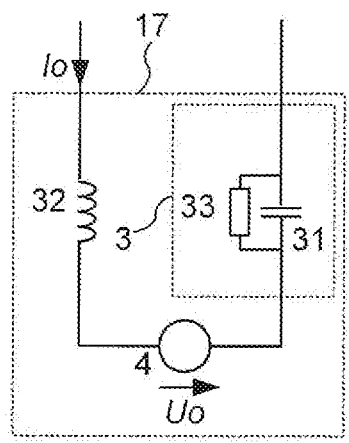

The resonant circuit 3 can take on many different configurations, of which some are shown in FIGS. 10a-c.

The oscillating current Io only exists during transitory periods whilst its amplitude AIo increases to exceed the magnitude AI of the main current I. It is appropriate if the capacitor voltage at any other time adapts to its average value, which is determined by the voltage across the main switch 1 and the voltage source 4. This condition will be automatically achieved, if the capacitor 31 is equipped by a discharging means, e.g. by a linear or non-linear resistor 33 connected in parallel, see FIG. 9. Although the discharge time should be substantially longer than the time needed for excitation of Io, it can still be quite short, in the range down to five milliseconds. The arrangement is specifically advantageous, when the current interrupting arrangement includes a disconnecting switch 5. In this case the capacitor will be completely discharged so that the main switch 1 may reclose without any discharge current, thereby making the main switch 1 ready to interrupt the current I immediately, when the disconnecting switch 5 closes.

Figure 11A:
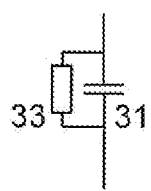
FIGS. 11A-C show different means for discharging a capacitor.
Figure 11B:
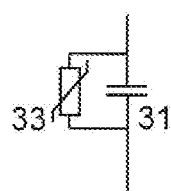
Figure 11C:
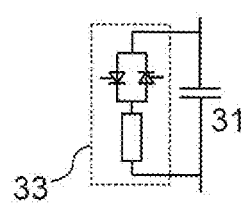

Configurations of alternative means for discharging a capacitor are shown in FIGS. 11a-c.

The passive resonant circuit 3 in FIG. 9 can be implemented as a simple series-connection of a capacitor 31 and an inductor 32. However, as stated above, further embodiments of an arrangement according to the invention may use other structures to implement the resonant circuit 3, see FIGS. 10*a-c*.

Figure 12:
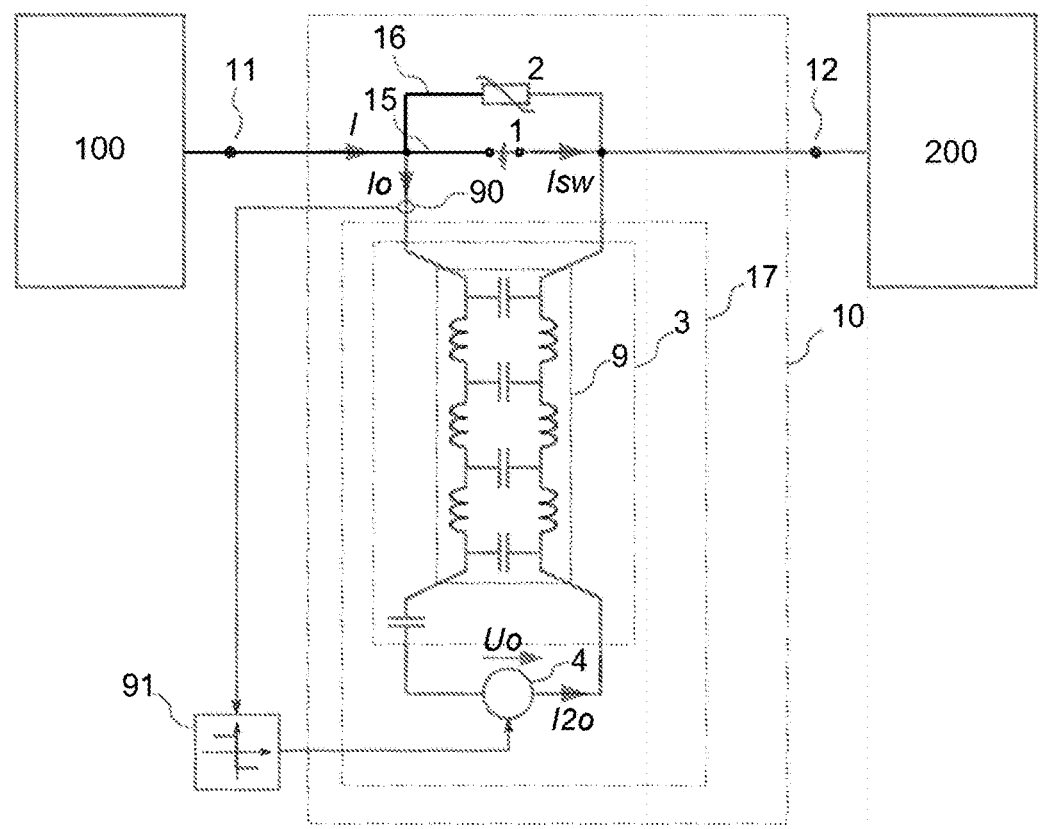
FIG. 12 shows an alternative embodiment of an arrangement for interrupting current comprising a resonance circuit containing a Heaviside's transmission line.

The required property of the oscillating current Io is that its amplitude surpasses the amplitude of the main current I, so that artificial zero-crossings are created in the current Isw passing through the main switch 1. The ideal oscillating current thus is a square wave, whose amplitude just exceeds the amplitude of the main current I. This ideal waveform can be created, if the passive series-LC circuit is replaced by a structure 9 like a Heaviside's transmission line, i.e. with a circuit containing distributed series inductance, $\ell$ [H/km], and distributed shunt capacitance, c [F/km]. The structure is illustrated in FIG. 12. It is characterized by its impedance, $$z_0 = \sqrt{\frac{\ell}{c}}$$

[Ω] and its phase velocity, $$v_p = \frac{1}{\sqrt{\ell c}}$$

[km/s]. A capacitor is inserted in series with the voltage source 4 in order to take up the voltage across the main switch 1, when it is open.

FIG. 12 also shows how the voltage source 4 may be controlled in order to obtain the desired square-wave waveform. The current Io in the far end is measured by a sensor 90 and a controller 91 detects its sign and controls the voltage source 4 to be in phase opposition with the measured current. This arrangement creates an oscillating square-wave-like current whose frequency is determined by the length, L [km], of the structure according to the formula $$f_{osc} = \frac{v_p}{2\pi L}$$

Figure 13:
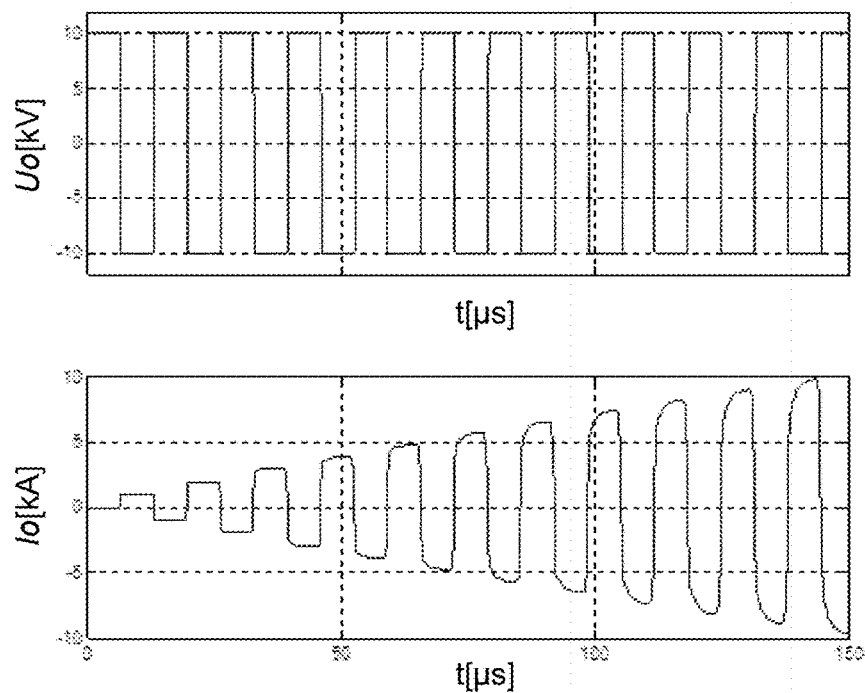
FIG. 13 shows wave forms produced by the arrangement of FIG. 12.

[Hz]. The relation between the voltage and the current is illustrated in FIG. 13.

Figure 14A:
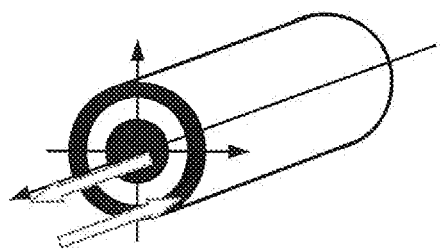
FIGS. 14A-D show structures with distributed capacitance and inductance.
Figure 14B:
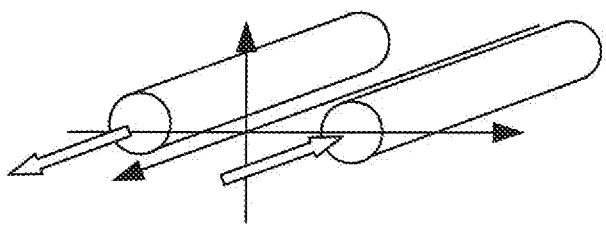
Figure 14C:
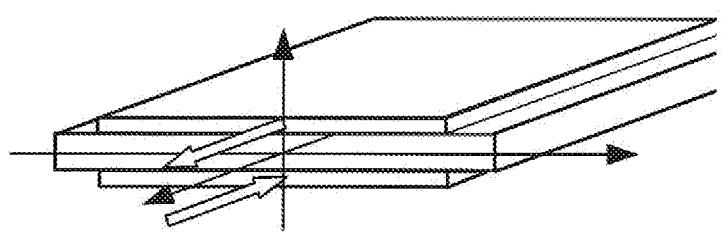
Figure 14D:
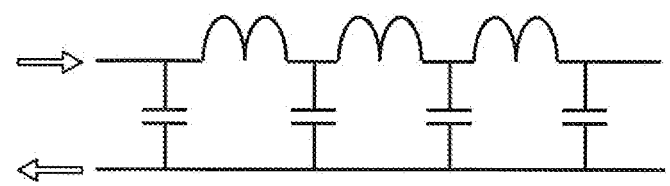

Several structures having distributed inductance and capacitance exist. Some of them are depicted in FIGS. 14*a-d*. The structures may be coaxial or plane. Normal cables have a coaxial structure and typically exhibit a characteristic impedance z0 in the range 20-30Ω and a phase velocity around half speed of light. Cable lengths of 1 km thus will be required to obtain an oscillation frequency around 10-20 kHz. Such length may make the use of cables uneconomical and then circuits that approximate the behavior of the Heaviside's transmission line using lumped capacitance and inductance may be utilized. Such approximations typically contain one or several π-links as shown in FIG. 14*d*.

The main switch 1 should have a fast mechanical actuating system making it possible to achieve contact separation within milliseconds. Preferably, vacuum switches are used, either a single switch or a string of series-connected devices. Due to the physics of their conduction mechanism they can extinguish very fast (microsecond range or faster) at or even before the current zero-crossing. Moreover, the required mechanical stroke is short and the mass of the moving contact is small, when compared with other types of mechanical interrupters.

A series-connection of a medium-voltage vacuum switch and a high-voltage breaker of other type also can be utilized. The main switch may also be series-connected with a low-voltage power electronic switch.

Furthermore, the main switch 1 may be implemented by several series-connected mechanical switches, which are operated so that the contact separation instants of the individual switches are distributed in time. This procedure may be used to safeguard that sufficient voltage withstand capability has been reached in at least one individual mechanical switch, when the current through the string of switches zero-crosses.

The controllable voltage source 4 shall be manipulated to control the amplitude of the oscillating current Io and to make zero-crossings in the current through the main switch 1 appear at adequate time instants, i.e. when the contact separation is sufficient to provide enough voltage handling capability. A good estimation of the contact separation as function of time can be achieved if one or more sensors for the instantaneous position and/or velocity is provided.

A sensor detecting contact separation in the main switch 1 can contribute with adequate information to the control and monitoring system for the controllable voltage source 4. Preferably, such a detector can be based on observation of any physical quantity that is related to the contact separation. Such phenomena are appearance of arcing voltage drop, acoustical phenomena, optical, thermal, X-ray or any other type of electromagnetic radiation or noise.

Preferably, the energy absorbing device 2 is a Metal Oxide Varistor (MOV), but alternatively other devices exhibiting resistance with similar strongly non-linear voltage dependence or a voltage-limiting arrangement can be used. Optionally a clamping circuit, consisting of a charged capacitor connected through diodes, may be used. Various implementations of the energy absorbing device 2 are shown in FIGS. 15*a-c*

In an alternative embodiment of an arrangement for interrupting current according to the invention, a fourth branch 18 has been added to the three branches 15,16,17 in the interrupting arrangement 10, see FIG. 16*a*. The purpose of the added branch is to offer a conductive path for the reverse current, which arises when the currents I and Io has the same sign and the amplitude of the oscillating current AIo exceeds that of the main current AI. The control system acts to make this path conductive, in the direction opposite to the main current I, when the oscillating current Io is excited. The reverse current then commutates into branch 18 when contact separation is present and accordingly zero current passes through the mechanical switch 1, which then reestablishes its dielectric voltage withstand capability. When the oscillating current Io swings back, and the current through the branch 18 again zero-crosses, the branch 17 comprising the resonant circuit 3 and the controllable voltage source 4 will be the only path that remains open for the main current I. The main current I charges the capacitor 31 until the voltage reaches the level where the voltage-limiting energy-absorbing device 2 starts to conduct. The protective voltage of device 2, which exceeds the voltage difference between the sources in sections 100,200 of the power system, then forces the main current I to zero.

The branch 18 may comprise a circuit arrangement 6 constituted by two unidirectional valves 61,62 connected in anti-parallel, see FIG. 16*a*. Each unidirectional valve comprises at least one thyristor. In some applications current interrupting is only required for currents I having a determined direction. In such cases it might be possible to implement only the thyristor valve with the conduction direction opposite to the main current I.

Figure 17:
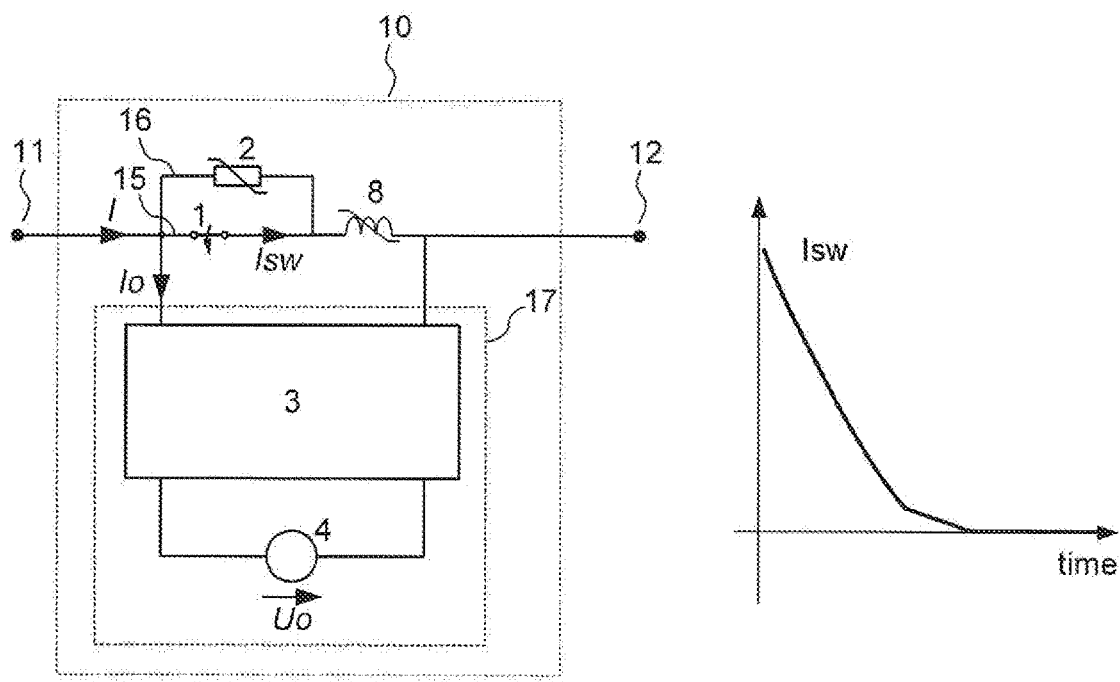
FIGS. 17A-C show an alternative embodiment of an arrangement for interrupting current having a saturable reactor.
Figure 17:
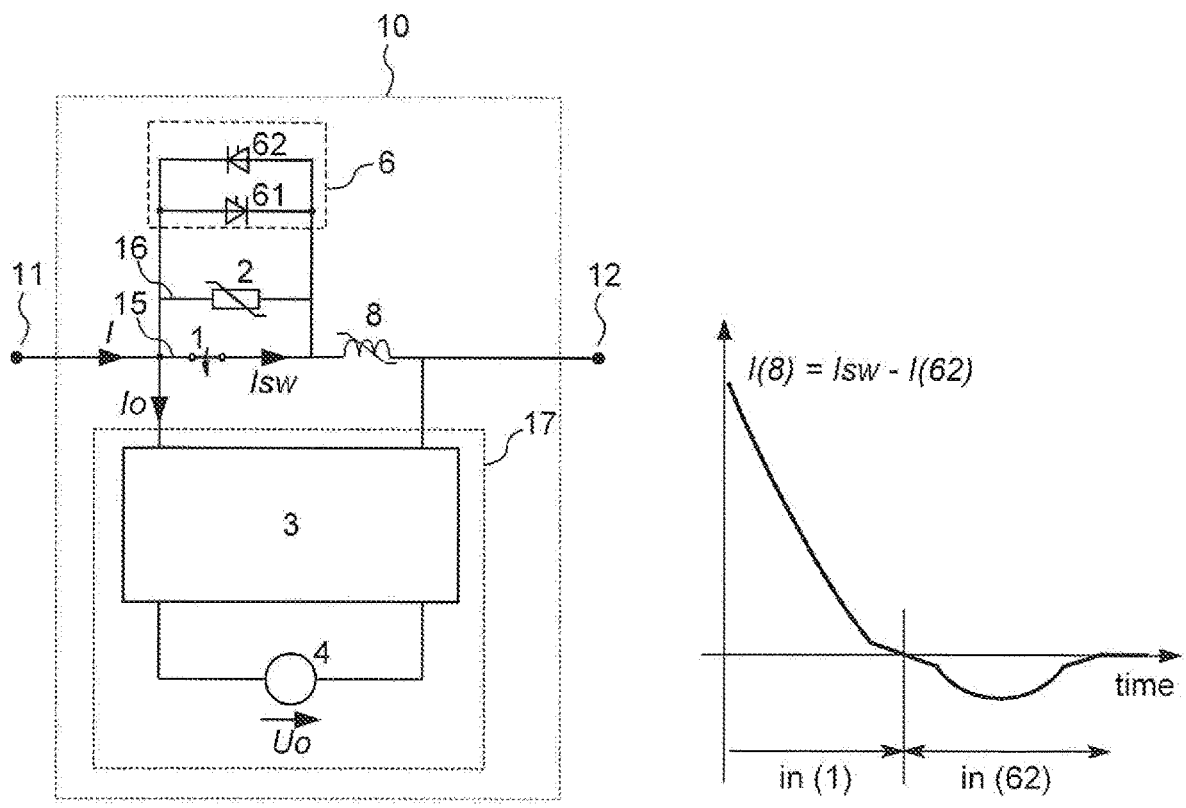
Figure 17:
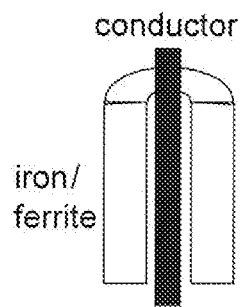

In an alternative embodiment of an arrangement for interrupting current according to the invention, the branch comprising the main switch 1 includes a saturable reactor 8 connected in series as shown in FIGS. 17*a-b*. The purpose is to reduce the current derivative at zero-crossing, which is beneficial for certain mechanical breakers with respect to their voltage handling capability immediately after current interruption. The principle is clarified in the figure. The saturable reactor 8 may take the form of an air-gapped magnetic core made of iron or ferrite that encloses a main conductor as shown in the sketch in FIG. 17*c*.

Figure 18:
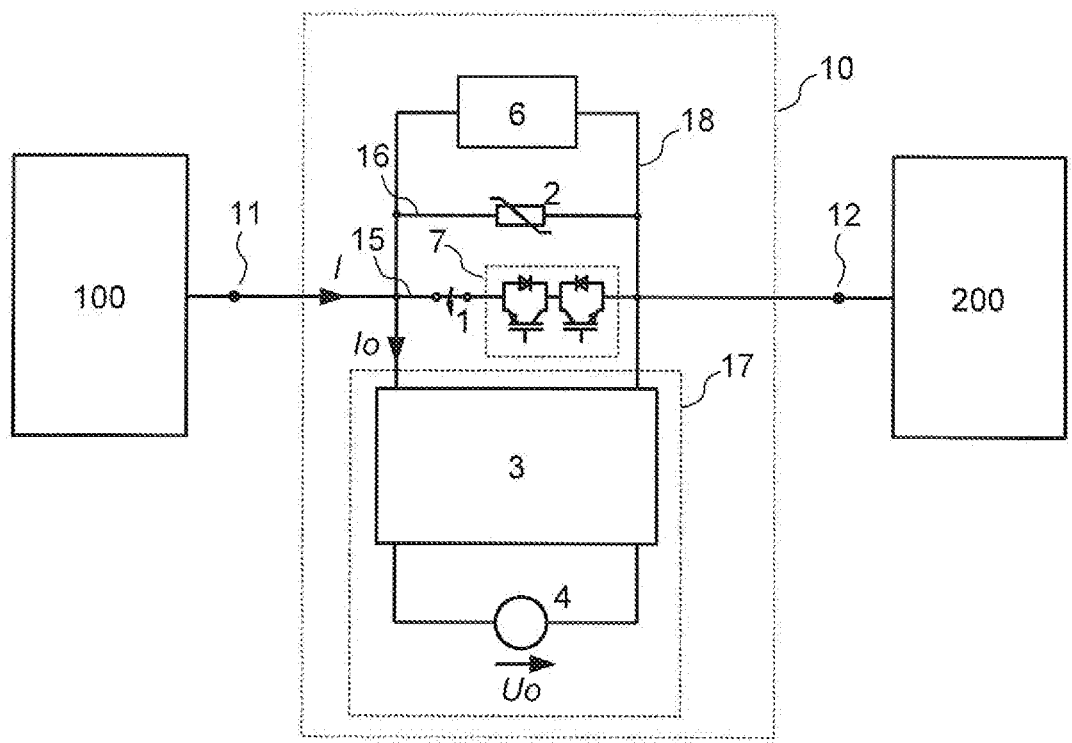
FIG. 18 shows an alternative embodiment of an arrangement for interrupting current comprising a low-voltage commutation semiconductor switch.

In order to ensure that the reverse current mentioned in the preceding section really commutates into the fourth branch 18 a low-voltage semiconductor switch 7 may be connected in series with the mechanical switch 1, see FIG. 18. The low-voltage switch 7 can be controlled only to allow current directed as the main current I blocking current in the reverse direction. It should be controlled in coordination with the control of the valves 61, 62 in branch 18.

Figure 19:
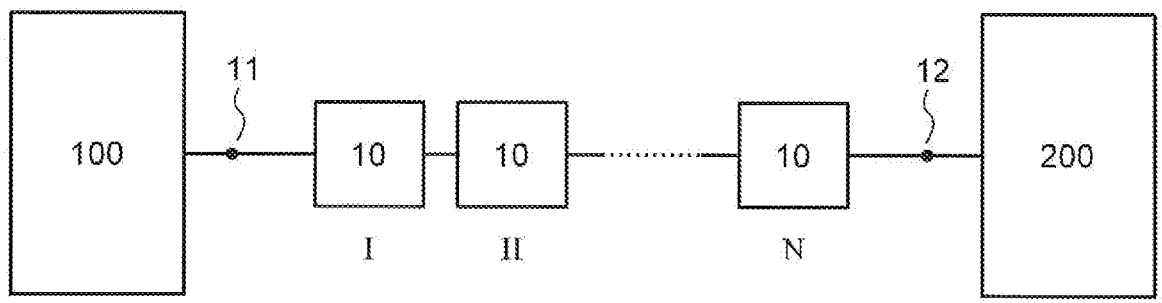
FIG. 19 shows a system for interrupting current according to the invention, comprising several arrangements for interrupting current.

Several current interrupting arrangements 10, described above, may be arranged in series between the sections 100,200 in the power system as shown in FIG. 19. By closing/opening the main switches 1 in the arrangements 10, a varying number of voltage-limiting energy-absorbing devices 2 can be inserted in the connection between the sections 100, 200 of the power system, in order to limit fault current flowing through the interconnection. As large amounts of energy will be accumulated in these devices it is only possible to maintain such operational conditions for a short time, maximum tens of milliseconds. This time however may be sufficient to limit the short-circuit current in a grid during the time required for determining which breakers in the system that shall operate at a specific disturbance.

A method to control the interrupting arrangement 10 described above will now be described. To execute this method, a control system is required to coordinate the opening of the mechanical switch 1 and the excitation of the oscillating current by controlling the voltage source 4.

The opening of the mechanical switch 1 simply starts by giving the "OPEN" command to the mechanical actuator, which starts to transfer the moving contact away from the fixed contact so that contact separation occurs. The mechanical delay time, tmech, i.e. the time elapsing from the "OPEN" command is given until contact separation has been established, normally is known with good accuracy, and it can be used by the control system. Although the mechanical delay time, in the range 1-5 ms, appears to be very short from the mechanical point of view, it is quite long from a power electronic perspective. Note e.g. that ten full cycles at 10 kHz will be completed during one millisecond, see FIGS. 20*a-b*, showing the principle of buildup of oscillating current amplitude in the resonant circuit 3 by the action of the fast controllable power electronic voltage source 4. Consider the LC-circuit illustrated in FIG. 20*a*. The circuit is characterized by its resonance frequency $$f_{osc} = \frac{1}{2\pi\sqrt{L_{osc}C_{osc}}}$$

and its reactance $$x_0 = \sqrt{\frac{L_{osc}}{C_{osc}}}$$

(at the resonance frequency). The circuit is excited by a voltage source which can be assumed to produce voltage of both polarities. The amplitude of the applied voltage is Uosc and its direction is controlled by power electronic means to follow the direction of the current Io. The ratio between the applied voltage amplitude Uosc and the characteristic reactance x0 defines a unit current, which can be denoted Iosc $$I_{osc} = \frac{U_{osc}}{x_0}$$

Initially the voltage source 4 produces a constant output voltage −Uosc, which is blocked by the series capacitor 31. When the excitation is activated an output voltage reversal will be performed and accordingly a voltage step with amplitude 2×Uosc is applied on the resonance circuit. Following this first reversal of the output voltage a sinusoidal current half-cycle with amplitude 2×Iosc will be created if losses are neglected. Its peak occurs after a quarter-cycle of the resonance frequency. When the current zero-crosses after a full half-cycle a new reversal is imposed and the amplitude of the oscillating current increases to 4×Iosc. Similarly at each zero-crossing of the oscillating current its amplitude increases with 2×Iosc. Accordingly, one quarter-cycle after N reversals (half-cycles) the amplitude of the oscillating current ideally is 2×N×Iosc. After three and a quarter cycles, i.e. after seven reversals, the amplitude of the oscillating current ideally is 14×Iosc.

Note that a substantial increase of the oscillating current amplitude is obtained in very short time. Consider e.g. a case where a current of 10 kA shall be interrupted with a protective voltage of 100 kV. An LC-circuit with characteristic reactance of x0=5 Ω may be adequate in such a case. Taking losses into consideration the amplitude of the oscillating current after four cycles is about 14×Iosc and it will exceed 10 kA with 10% if Iosc=1.1×10/14=0.79 kA. The required dc link voltage is Uosc=x0×Iosc=5×0.79=3.9 kV, which is only 3.9% of the protective voltage. Moreover, the time to reach this amplitude is only four cycles, i.e. 333 µs at 12 kHz, which is substantially shorter than the mechanical delay time, tmech. The voltage rating of the semiconductors in the power electronic converter becomes 2×Uosc, i.e. 7.8% of the protective voltage.

This example indicates that the current interrupting arrangement 10 according to this invention allows a substantial reduction of the amount of semiconductor devices when compared to other known arrangements, that typically require that semiconductors rated for the full protective voltage with both polarities should be used.

Figure 21:
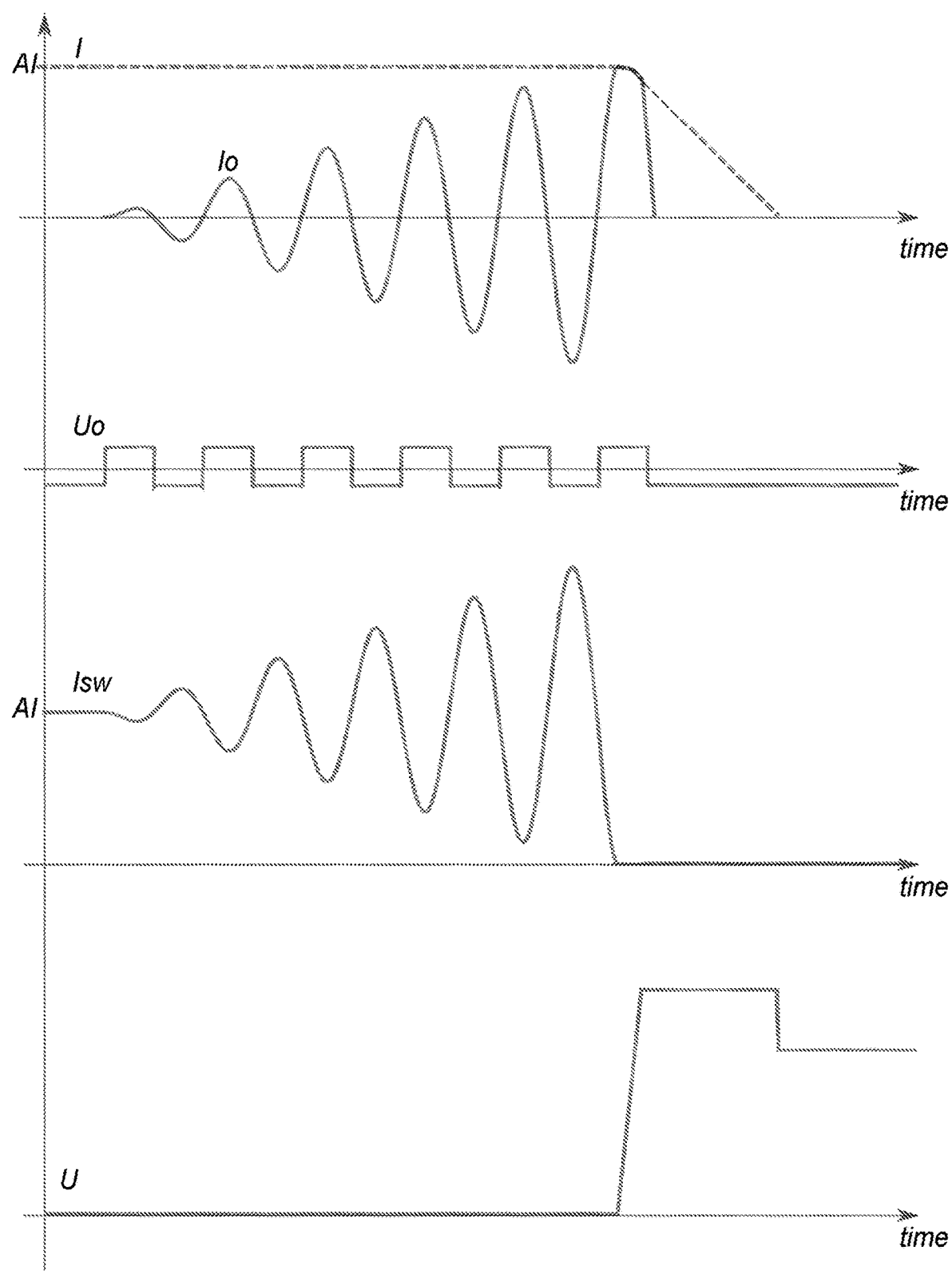
FIG. 21 shows principal waveforms at current interruption.

FIG. 21 shows the course of the current interruption operation as described above. Typically the current interruption occurs, when the oscillation current Io has the same direction as the main current I and the amplitude of the oscillating current AIo passes the amplitude of the main current AI. Then the voltage across the main switch 1 experiences a linear voltage change, when the main current I charges the capacitor 31 until the voltage across the voltage-limiting energy-absorbing device 2 reaches the protective voltage of the latter and it takes over the main current.

When the current interrupting arrangement 10 includes a fourth branch 17, containing means to carry the "reverse" current, i.e. excess current Isw=Io−I that occurs when, during the interrupt operation, the oscillating current Io and the main current I have the same direction and the amplitude of the oscillating current Io exceeds the amplitude of the main current I. Current interruption then occurs when the amplitude of the oscillation current Io decreases. A linear increase of the capacitor voltage results until the voltage has reached the protective voltage in the energy-absorbing device 2.

Preferably, coordinated control of the opening of the mechanical switch 1 and the excitation of the oscillating current Io is provided in order to perform successful current interruption of the main current I.

When the current interrupting arrangement 10 includes a disconnecting switch 5, reverse conducting means 6, or an auxiliary low-voltage switch 7 assisting the commutation of the main current I to the reverse conducting means 61,62, the control of the corresponding switches could preferably be included in the coordinated control scheme.

The sequence of the execution of the steps are preferably predefined such that zero-crossings in the current Isw, passing through the mechanical breaker, occur when sufficient dielectric isolation strength to withstand the voltage limit of the energy absorbing device of the second parallel branch has been built up in the breaker after contact separation.

Figure 22:
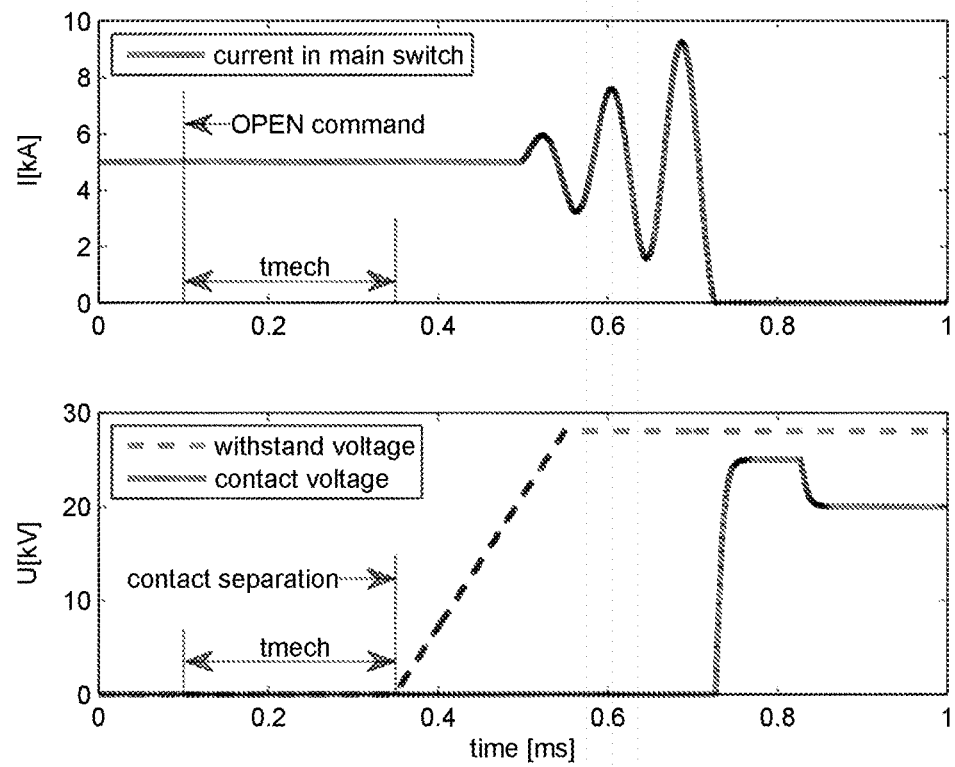
FIG. 22 illustrates current zero-crossing versus voltage withstand capability.

The coordination of the steps of control aims to secure that sufficient contact separation in order to provide enough voltage withstand capability in the mechanical switch 1 has been established, when the zero-crossing in the current passing through the mechanical switch 1 is created by the oscillating current Io, as illustrated in FIG. 22.

Figure 23:
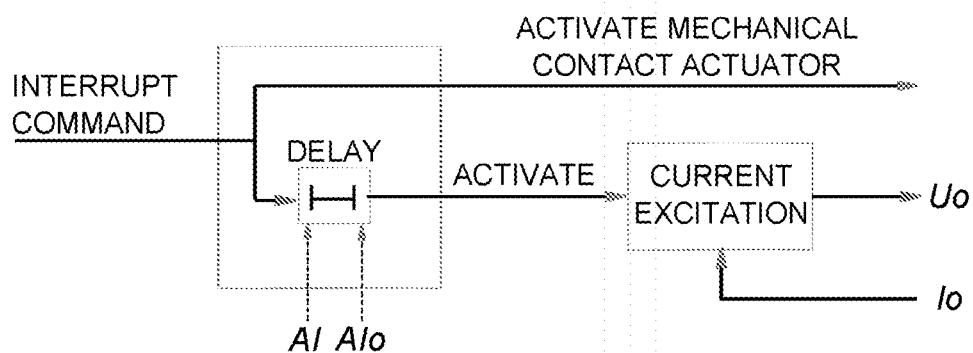
FIGS. 23 and 24 illustrate some examples of signal control.

Often the mechanical delay time is well defined and known, and the course of the excitation of the oscillating current is well controlled. If this is the case the signals given to the switches are preferably given in a defined time sequence based on time-delays with reference to the command to open the mechanical switch 1, as shown in FIG. 23. The time delay may be varied in dependence of the measured value of the main current I.

Figure 24:
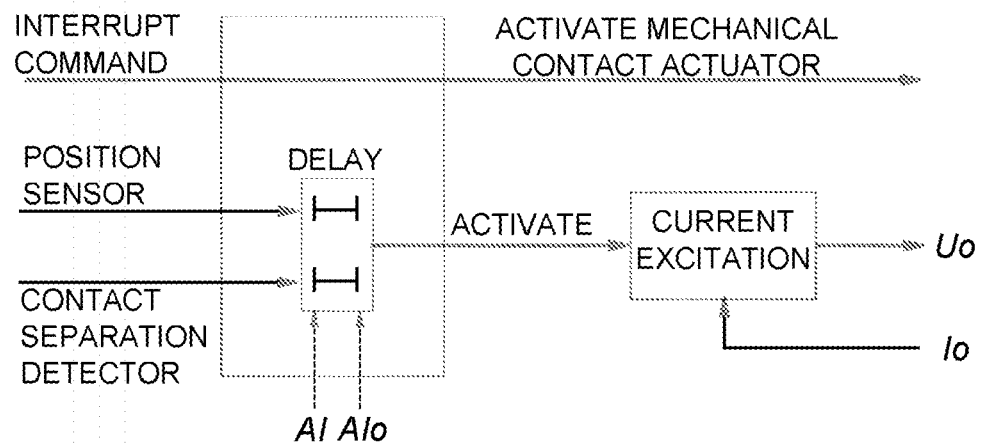

Preferably, the signals given to the switches are determined in dependence of signals from any sensor detecting that contact separation has occurred or indicating the position of the moving contact during the opening operation. Optionally fixed time delays can be used or variable time delays which depend on measured values of the main current I and/or the oscillating current Io or sensed value of the moving contact velocity. Some examples are shown in FIG. 24.

If the time to excite the oscillating current amplitude AIo to exceed the main current level AI is longer than the mechanical delay time, tmech, it may be advantageous to start the excitation as soon as the main current I exceeds a lower level than the normal trip level, maintaining the amplitude of the oscillating current close to the amplitude of the main current I awaiting the final decision to execute current interruption, in which case the mechanical switch is commanded to operate and the amplitude of the oscillating current is controlled to exceed the main current amplitude AI, or not to complete the current interruption, in which case the excitation of the oscillating current will be inhibited. The amplitude of the oscillating current may be maintained at a more or less constant level by inhibiting selected commutations in the controlled voltage source 4.

Situations occur where several current interrupting arrangements 10 have been connected in series with the aim to limit the main current I passing between the sections 100, 200 in the power system. Typically such installations may be of interest in dc grids interconnecting several hvdc stations. Such dc grids may contain a number of dc breakers and it is important that, at a fault in the grid, only the relevant dc breaker is operated. The proper selection may require some time, in the order of a few milliseconds. During that time insertion of a controllable number of current interrupting arrangements 10 makes it possible to prevent further increase of the main current I.

Figure 25:
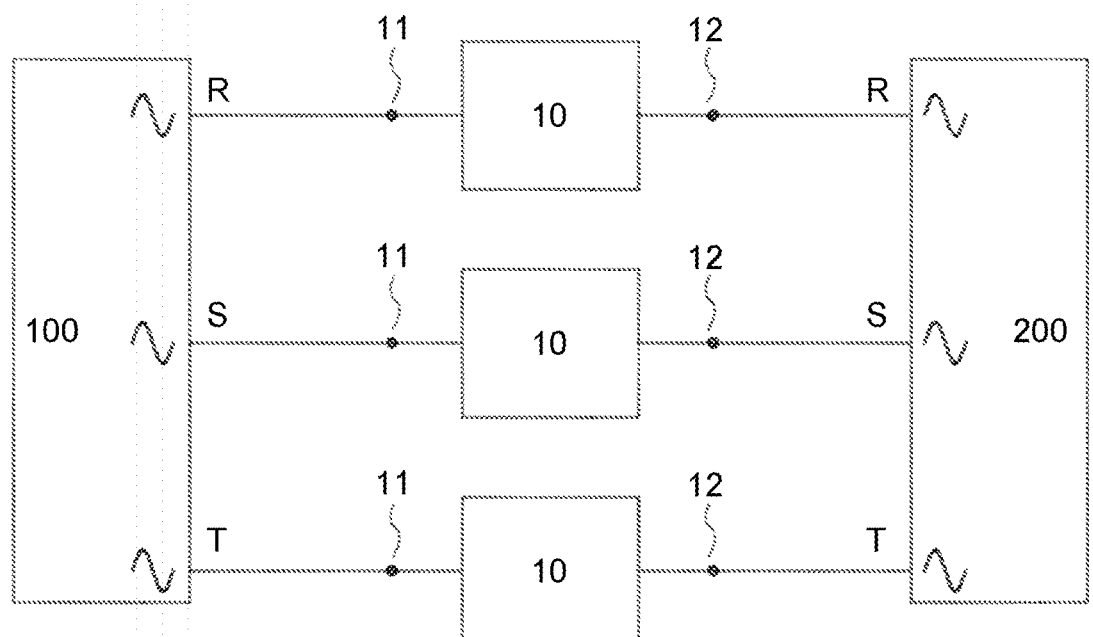
FIGS. 25 and 26A-B show different network configurations comprising one or more arrangements for interrupting current.
Figure 26:
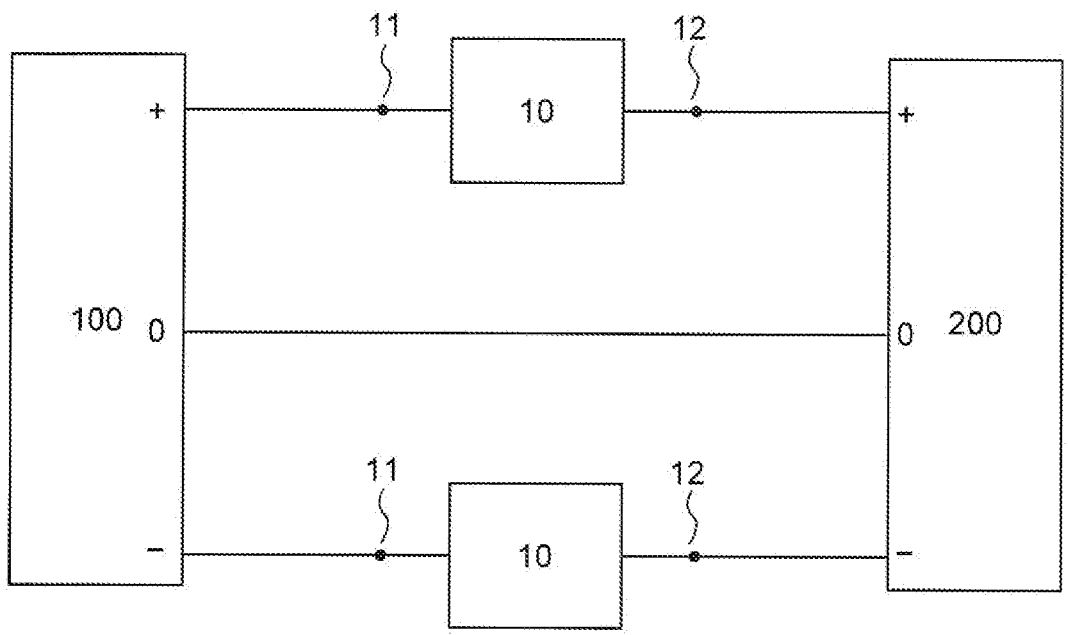
Figure 26:
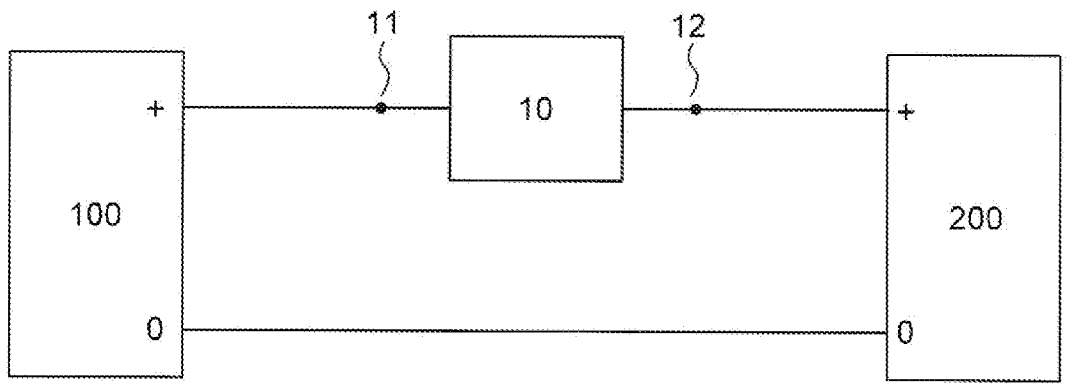

The arrangement for interrupting current according to the invention can be used in different power network configurations, of which three are illustrated in FIG. 25, showing an ac power network, and FIG. 16a-b, showing dc power networks.

Also other embodiments with regard to the third circuit branch 17 are conceivable. It may for instance be preferable to use several parallel connected branches consisting of a voltage control means 4 and a resonant circuit 3 as shown in FIG. 27a. In this way a larger resonant current amplitude AIo can be achieved, whereby a current with larger amplitude AI can be interrupted by the breaker. In case such an arrangement is used, preferably the different voltage control means 4 should provide approximately the same voltage, whereby the currents circulating between these parallel branches are minimized and the total resonant current Io can be maximized.

A further embodiment, shown in FIG. 27b, involves a parallel-connection of several branches consisting of a voltage control means 4 in series with an inductor 32. This parallel-connected entity is connected in series with at least one capacitor 31 thus forming the third circuit branch 17 of the arrangement for interrupting current 10. The inductors together with the capacitor form resonant circuits that can be excited by the voltage control means. Provided that the different voltage control means 4 provide approximately the same voltage the resonant currents flowing though each of the parallel connected branches will be in phase and thus summing together to form a total resonant current Io with a larger amplitude AIo that permits the interruption of currents with larger amplitude AI than would be possible with a single voltage control means.

The embodiments shown in FIGS. 27a and 27b both offer a certain degree of modularity whereby breakers with different current interrupting capability can be designed by using different numbers of parallel branches containing the voltage control means. Thereby fewer types of voltage control means need to be designed and sourced, which can offer cost savings.

Preferred embodiments of an arrangement, a system, and a method for interrupting current according to the invention have been given. It will be appreciated that these may be varied within the scope of the appended claims without departing from the inventive idea.

The invention claimed is:

1. An arrangement for interrupting current comprising a first and a second terminal, at least a first, a second, and a third parallel circuit branch arranged between the first and second terminals, the arrangement being adapted to electrically connect two sections of a power system, the first parallel circuit branch comprising a mechanical main circuit breaker, the second parallel circuit branch comprising an energy absorbing device, and the third parallel circuit branch comprising a resonant circuit and a voltage control means arranged in series with the resonant circuit, wherein the voltage control means is a static voltage source converter comprising a DC voltage source having low internal impedance and providing a dc voltage between its terminals that is independent of the currents in all branches, together with a semiconductor arrangement which, by control in real-time, modifies the voltage inserted in series with the resonant circuit to achieve at least two of the alternative values: the dc voltage with positive polarity, the dc voltage with negative polarity or, zero when the dc voltage is bypassed, wherein the voltage in the dc voltage source in the voltage source converter is at least one order of magnitude lower than the voltage across the energy absorbing device in the second parallel circuit branch, when energy is being absorbed, and wherein the first and third parallel circuit branches are permanently connected in parallel to establish a loop having low impedance at the resonance frequency of the resonant circuit, when the main breaker is mechanically closed and during the arcing while the contacts are parting, and wherein the static voltage source converter is controllable in use to inject energy into the resonant circuit in the low-impedance loop, established by the parallel connection between the first parallel circuit branch and the third parallel circuit branch, to, independent of the main current (I), force a rapid increase of the amplitude of an alternating current (Io) during several consecutive oscillation cycles, as the mechanical main circuit breaker is being controlled to open to interrupt a main current (I), and whereby zero cross-over of the current through the mechanical main circuit breaker is realized as the alternating current amplitude exceeds the main current amplitude.

2. The arrangement for interrupting current according to claim 1, further comprising at least one disconnecting switch arranged in series connection with at least one of the first and second terminals, and being controllable in use to provide a physical separation of the two said power networks.

3. The arrangement for interrupting current according to claim 1, wherein the resonant circuit comprises at least one capacitor and at least one reactor arranged in series.

4. The arrangement for interrupting current according to claim 3, wherein the at least one capacitor of the resonant circuit is provided with a discharging means.

5. The arrangement for interrupting current according to claim 1, wherein the resonant circuit comprises distributed series inductance and distributed shunt capacitance, preferably a cable arrangement.

6. The arrangement for interrupting current according to claim 1, wherein the mechanical main circuit breaker comprises a vacuum switch.

7. The arrangement for interrupting current according to claim 1, wherein the mechanical main breaker comprises a contact adapted to move during the opening process of the mechanical main circuit breaker, and wherein the mechanical main circuit breaker comprises at least one sensor.

8. The arrangement for interrupting current according to claim 7, wherein said at least one sensor is adapted in use to determine at least one of the positions and the velocity of the contact during the opening process of the mechanical main circuit breaker.

9. The arrangement for interrupting current according to claim 7, wherein said at least one sensor is adapted to detect a physical quantity, preferably at least one of appearance of arcing voltage drop, acoustical phenomena and electromagnetic radiation or noise, such as optical, thermal, or X-ray radiation.

10. The arrangement for interrupting current according to claim 1, wherein the energy absorbing device is a voltage limiting, energy absorbing device.

11. The arrangement for interrupting current according to claim 10, wherein the energy absorbing device is a non-linear voltage dependent resistance, preferably a Metal Oxide Varistor (MOV).

12. The arrangement for interrupting current according to claim 1, wherein the first parallel circuit branch further comprises a saturable reactor arranged in series with the mechanical main circuit breaker to help reduce the rate of change of current in the proximity of the zero cross-over of the current through the mechanical breaker.

13. The arrangement for interrupting current according to claim 1, further comprising a fourth parallel circuit branch arranged in parallel with said first, second, and third parallel circuit branches, said fourth parallel circuit branch being provided with control means to, during a current interruption, provide an alternative path for the reverse current (Io-I) away from the mechanical main circuit breaker.

14. The arrangement for interrupting current according to claim 13, wherein the control means comprises two thyristors arranged in anti-parallel to control current flow through said two thyristors in opposite directions.

15. The arrangement for interrupting current according to claim 13 wherein the first parallel circuit branch further comprises a low-voltage semiconductor switch arranged in series with the mechanical breaker, the low-voltage semiconductor being controllable in use to help divert the current from the main mechanical breaker to the fourth parallel circuit branch.

16. The arrangement for interrupting current according to claim 1, wherein the arrangement for interrupting current is a dc breaker.

17. The arrangement for interrupting current according to claim 1, wherein the resonant circuit is a passive resonant circuit.

18. A system for interrupting current comprising at least two arrangements for interrupting current according to claim 1, wherein said at least two arrangements for interrupting current are connected in series.

19. A method of interrupting current in a power system using an arrangement for interrupting current according to claim 1, the method comprising the steps of;

opening the mechanical circuit breaker to facilitate the separation of the contacts of the mechanical main circuit breaker and to interrupt a main current (I) having an amplitude (AI), and controlling the voltage control means to excite an oscillating current (Io) having a maximum amplitude (AIo) higher than the amplitude (AI) of the interrupted main current (I), to cause current zero-crossing.

20. The method of interrupting current according to claim 19, wherein the steps of opening the mechanical circuit breaker and controlling the voltage control means are performed concurrently and in coordination.

21. The method of interrupting current according to claim 19, wherein the execution of one or several of the steps is conditional, so that an oscillating current, which has such amplitude that zero-crossings occur in the current (Isw) flowing through the mechanical interrupter, is excited and maintained, until a decision is taken, either to execute the complete sequence of steps to interrupt the main current (I), or not to complete the interruption, in which case the oscillating current will be suppressed.

\* \* \* \* \*